(12) United States Patent
Hsu et al.

(10) Patent No.: US 7,110,073 B2
(45) Date of Patent: Sep. 19, 2006

(54) POLARIZER FOR A MULTI-DOMAIN VERTICAL ALIGNMENT LIQUID CRYSTAL DISPLAY

(75) Inventors: Jung-Hung Hsu, Ping Chen (TW); Lung-Hai Wu, Ping Chen (TW); Chien-Wei Tsou, Ping Chen (TW); Ta-Wang Lai, Ping Chen (TW)

(73) Assignee: Optimax Technology Corporation, Ping Chen (TW)

( * ) Notice: Subject to any disclaimer, the term of this patent is extended or adjusted under 35 U.S.C. 154(b) by 51 days.

(21) Appl. No.: 10/890,202

(22) Filed: Jul. 14, 2004

(65) Prior Publication Data

US 2005/0030447 A1  Feb. 10, 2005

(30) Foreign Application Priority Data

Aug. 6, 2003  (TW) .............. 92121577 A

(51) Int. Cl.
  *G02F 1/1335*  (2006.01)
(52) U.S. Cl. .................................... 349/119
(58) Field of Classification Search ............... 349/119
  See application file for complete search history.

(56) References Cited

U.S. PATENT DOCUMENTS

| 6,680,766 B1 * | 1/2004 | Larson et al. ............... 349/121 |
| 6,922,222 B1 * | 7/2005 | Miyachi et al. ............. 349/118 |
| 6,977,700 B1 * | 12/2005 | Uesaka et al. .............. 349/114 |
| 2001/0030726 A1 | 10/2001 | Yoshida et al. |
| 2001/0048497 A1 * | 12/2001 | Miyachi et al. ............. 349/117 |
| 2002/0159006 A1 | 10/2002 | Miyatake et al. |
| 2003/0067574 A1 * | 4/2003 | Sasaki et al. ............... 349/117 |
| 2004/0223104 A1 * | 11/2004 | Chang ........................ 349/118 |
| 2004/0257506 A1 * | 12/2004 | Tashiro et al. ............. 349/123 |

FOREIGN PATENT DOCUMENTS

| JP | 2002-116464 | 4/2002 |
| JP | 2003-014936 | 1/2003 |
| JP | 2003-029264 | 1/2003 |

* cited by examiner

*Primary Examiner*—James A. Dudek
(74) *Attorney, Agent, or Firm*—Birch, Stewart, Kolasch & Birch, LLP

(57) ABSTRACT

A polarizer used in liquid crystal display has two portions. A first portion of the polarizer is adjacent to a backlight source and has a first protective film, a first linear polarizing film, a first biaxial film and a first quarter-wave film from the backlight source to a multi-domain vertical alignment liquid crystal (MVA-LCD) cell. A second portion of the polarizer is on the other side of the MVA-LCD cell, and has a second quarter-wave film, a second biaxial film, a second linear polarizing film and a second protective film from the MVA-LCD cell.

24 Claims, 8 Drawing Sheets

POLARIZER FOR A MULTI-DOMAIN VERTICAL ALIGNMENT LIQUID CRYSTAL DISPLAY

RELATED APPLICATIONS

The present application is based on, and claims priority from, Taiwan Application Ser. Number 92121577, filed Aug. 6, 2003, the disclosure of which is hereby incorporated by reference herein in its entirety.

BACKGROUND

1. Field of Invention

The present invention relates to an apparatus of a liquid crystal display. More particularly, the present invention relates to a polarizer of a multi-domain vertical alignment liquid crystal display.

2. Description of Related Art

Liquid crystal display (LCD) has many advantages over other conventional types of displays including high display quality, small volume, light weight, low driving voltage and low power consumption. Hence, LCDs are widely used in small portable televisions, mobile telephones, video recording units, notebook computers, desktop monitors, projector televisions and so on, and have gradually replaced the conventional cathode ray tube (CRT) as a mainstream display unit. Therefore, the market is mainly occupied by LCDs due to the high display quality and the low power consumption of the LCDs.

Large size, high resolution, wide view and rapid response time are the main demands on the LCDs. Multi-domain vertical alignment (MVA) is one popular wide view technique in which the vertical alignment technique, where the vertical alignment liquid crystal has a negative anisotropic dielectric constant, and the domain division technique are implemented. In an MVA-LCD, a plurality of protrusions are formed on the thin film transistor (TFT) and color filter (CF) substrates thereof for forming different domains, and liquid crystal molecules in different domains are aligned in different directions, thus achieving the wide view.

FIG. 1A illustrates a schematic view of a conventional multi-domain vertical alignment liquid crystal panel. As illustrated in FIG. 1A, a liquid crystal pixel 102 is divided into four domains by several TFT substrate protrusions 112 and CF substrate protrusions 114. Each domain separately contains liquid crystal molecules 122, 124, 126 and 128 which are aligned in different directions. FIG. 1B is a schematic view of alignment directions of liquid crystal modules in different domains in FIG. 1A. In the four domains, the liquid crystal molecules 122, 124, 126 and 128 are aligned in different directions, thus achieving the wide view.

The MVA technique used in an LCD generally provides at least four alignment domains in one liquid crystal pixel to perform the wide view feature including at least four directions. For the viewing-angle characteristics of the four-domains alignment division, the viewing-angle characteristic of the 45 and 135 viewing directions is poor. A simple compensation method is to use an optical compensating film, such as a biaxial film, to obtain better viewing-angle characteristics.

However, in addition to the viewing-angle characteristic of the 45 and 135 viewing directions, the MVA technique still has insufficient brightness. As described above, the protrusions are formed on the substrates to divide the domains and align the liquid crystal molecules in the MVA technique. These protrusions unavoidably decrease the aperture ratio of the liquid crystal panel, and the aperture ratio directly relates to the brightness of the LCD. When the aperture ratio is increased, the brightness of the LCD is also increased. Therefore, the protrusions used in the MVA technique generally reduce the brightness of the LCD, thus causing the insufficient brightness problem.

Moreover, in the vertical alignment technique, in an OFF state, the liquid crystal molecules are vertically aligned where the alignment thereof is perpendicular to the substrate to represent a dark state. On the other hand, in an ON state, the liquid crystal molecules are tilted to be horizontally aligned by the electric field, where the alignment thereof is parallel to the substrates but not parallel to any absorption axis of the upper or the lower linear polarizing film in the LCD to represent a light state. When two adjacent liquid crystal molecules are tilted by the electric field, the two adjacent liquid crystal molecules typically touch each other because they are too close. And, under the continuous effect of the electric filed, the two adjacent liquid crystal molecules are forced to tilt in directions parallel to the absorption axis of the upper or the lower linear polarizing film. Finally, the alignment of the two adjacent liquid crystal molecules contrarily is parallel to the absorption axis of the upper or the lower linear polarizing film.

Therefore, when this type of liquid crystal pixel is in the ON state, the central position thereof appears to have a dark, cross-like texture because the alignment directions of the liquid crystal molecules at domain boundaries are parallel to the absorption axis as described above. The dark, cross-like texture reduces the brightness of the ON state liquid crystal pixel. Moreover, because the contrast of the liquid crystal pixel is defined as a ratio of the ON state brightness thereof to the OFF state brightness thereof, the dark, cross-like texture also lowers the contrast of the liquid crystal pixel, thus causing insufficient brightness and contrast of the LCD.

Conventional MVA-LCDs have the foregoing insufficient brightness and contrast problems; thus, to maintain high brightness and high contrast of the MVA-LCDs, more lamp tubes are used in the backlight source thereof when the LCDs are designed and manufactured. However, if the number of the lamp tubes in the backlight source is increased, the power needed is accordingly raised, and the heat generated thereby is also much greater. High power consumption decreases the use time of portable electronic devices that widely use LCDs, such as notebooks or personal digital assistants (PDAs), and is harmful during use. In addition, unnecessary heat usually burdens the heat dissipation systems of the LCDs, and also accelerates the loss and reduces the lifetime of the lamp tubes of the backlight source.

SUMMARY

It is therefore an objective of the present invention to provide a polarizer for a multi-domain alignment liquid crystal display (MVA-LCD) to enhance the brightness of the MVA-LCD, and reduce the conventional high power consumption and high heat.

It is another an objective of the present invention to provide a polarizer for a multi-domain alignment liquid crystal display in which a quarter-wave film is inserted therein to raise the light efficiency, thus increasing the ON state brightness of the liquid crystal display and effectively decreasing the loss of the lamp tubes of the backlight source thereof.

In accordance with the foregoing and other objectives of the present invention, a polarizer having two portions is provided. A first portion of the polarizer is adjacent to a backlight source and includes a first protective film, a first linear polarizing film, a first biaxial film and a first quarter-wave film from the backlight source to a multi-domain vertical alignment liquid crystal (MVA-LCD) cell. A second portion of the polarizer is on the other side of the MVA-LCD cell, and includes a second quarter-wave film, a second biaxial film, a second linear polarizing film and a second protective film from the MVA-LCD cell.

The two portions form the polarizer configured in the MVA-LCD. The quarter-wave films in the polarizer convert an originally linearly polarized light into a circularly polarized light. The optical characteristic of the circularly polarized light eliminates the conventional dark, cross-like texture, so as to enhance the brightness of the MVA-LCD, and further to decrease the power consumption and the loss of the lamp tubes of the same.

In the polarizer of the invention, two absorption axes of the two linear polarizing films are perpendicular to each other, in conjunction to control the light and dark of the liquid crystal pixels. Moreover, two slow axes of the two quarter-wave films are also perpendicular to each other, such that the circular or elliptic polarized light, which is converted from the linearly polarized light by the first quarter-wave film, can be completely converted back into the original linearly polarized light by the second quarter-wave film.

The wavelength range of the visible light is from about 400 nm to about 700 nm. The central wavelengths of the foregoing quarter-wave film are therefore selected within a range of between about 460 nm and 600 nm, for a better performance. Furthermore, the invention provides broadband quarter-wave films to provide a polarizer with good compensation within the whole wavelength range of the visible light between about 400 nm and 700 nm.

According to one preferred embodiment of the invention, the light emitted from the backlight source is sequentially propagated through the first protective film, the first linear polarizing film, the first biaxial film, the first quarter-wave film, the MVA-LCD cell, the second quarter-wave film, the second biaxial film, the second linear polarizing film and the second protective film.

According to another preferred embodiment of the invention, the light emitted from the backlight source is sequentially propagated through the first protective film, the first linear polarizing film, the first quarter-wave film, the first biaxial film, the MVA-LCD cell, the second biaxial film, the second quarter-wave film, the second linear polarizing film and the second protective film.

According to another preferred embodiment of the invention, when an angle between the absorption axes of the linear polarizing films and the slow axes of the quarter-wave film is 45 degrees, the quarter-wave film converts the linearly polarized light into the circularly polarized light, in which the polarizing direction of the light is varied in every direction with time, and the compensation effect of the polarizer is great. Moreover, when the two slow axes of the two biaxial films are perpendicular to each other, and the slow axis of each biaxial film is also perpendicular to the absorption axis of the linear polarizing film adjacent thereto, and the compensation effect in viewing-angle is thus optimized.

According to another embodiment of the invention, a narrowband half-wave film and a narrowband quarter-wave film are combined to obtain an equivalent broadband quarter-wave film. An angle between the absorption axis of the linear polarizing film and a slow axis of the narrowband quarter-wave film adjacent thereto is between about 50 degrees and 80 degrees, and an angle between the absorption axis of the linear polarizing film and a slow axis of the narrowband half-wave film adjacent thereto is between about 0 and 40 degrees.

The invention uses a quarter-wave film to convert the linearly polarized light entering the MVA cell into the circularly polarized light, thus preventing linearly polarized light, in which the polarizing direction is single direction, from being affected by the liquid crystal molecules tilted parallel to the absorption axis of the first or second linear polarizing film to generate the dark, cross-like texture in the pixel center. Therefore, the invention raises the light efficiency, and increases the ON state brightness of the liquid crystal display, and extends the lifetime of the lamp tubes of the backlight source.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1A:
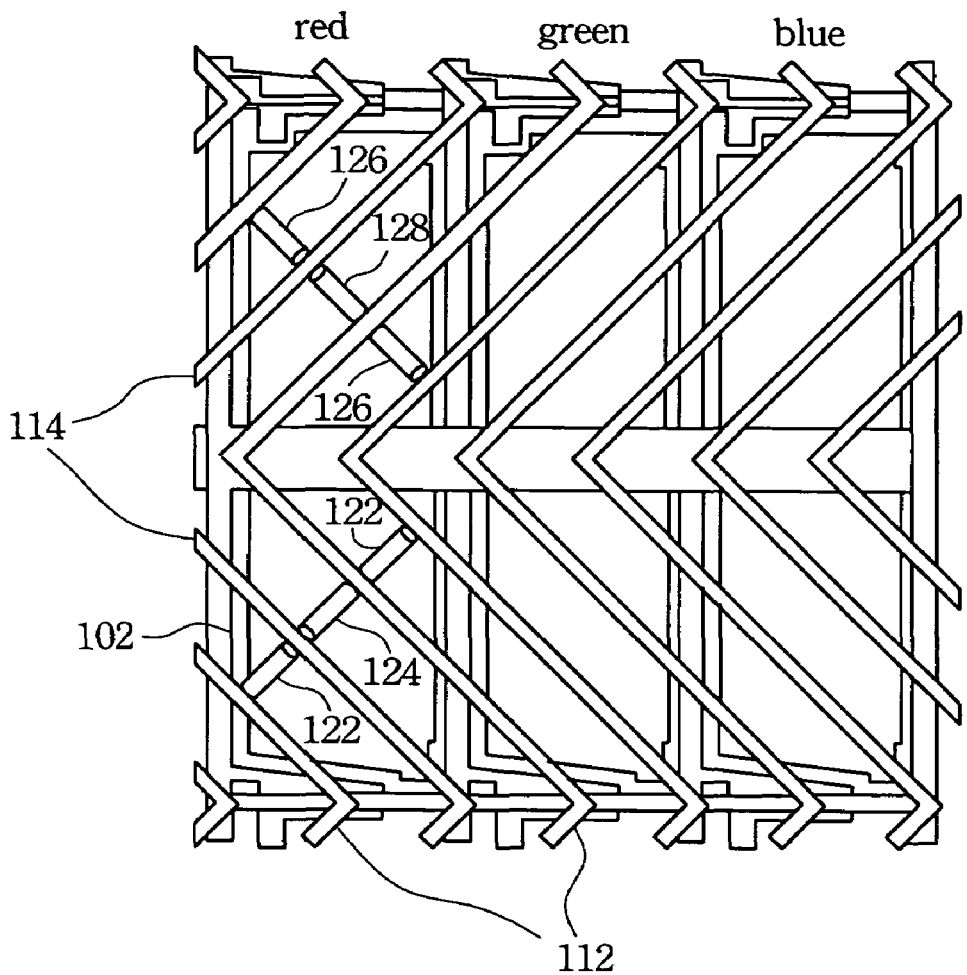
FIG. 1A illustrates a schematic view of a conventional multi-domain vertical alignment liquid crystal panel.
Figure 1B:
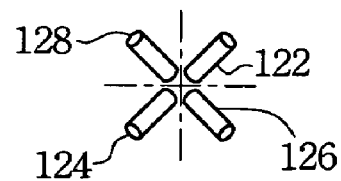
FIG. 1B is a schematic view of alignment directions of liquid crystal modules in different domains in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

A polarizer for a multi-domain alignment liquid crystal display (MVA-LCD) includes two portions. A first portion of the polarizer is adjacent to a backlight source and includes a first protective film, a first linear polarizing film, a first biaxial film and a first quarter-wave film from the backlight source to a multi-domain vertical alignment liquid crystal (MVA-LCD) cell. A second portion of the polarizer is on the other side of the MVA-LCD cell, and includes a second quarter-wave film, a second biaxial film, a second linear polarizing film and a second protective film from the MVA-LCD cell.

The two portions form the polarizer configured in the MVA-LCD. The quarter-wave films in the polarizer convert an original, linearly polarized light into a circularly polarized light. The optical characteristic of the circularly polarized light eliminates the conventional dark, cross-like texture, so as to enhance the brightness of the MVA-LCD, and further to decrease the power consumption and the loss of the lamp tubes of the same.

In the polarizer of the invention, two absorption axes of the two linear polarizing films are perpendicular to each other, for mutually cooperating to control the light and dark of the liquid crystal pixel. Moreover, two slow axes of the two quarter-wave films are also perpendicular to each other, such that the circular or an elliptic polarized light converted from the linearly polarized light by the first quarter-wave film can be completely converted back into the original, linearly polarized light by the second quarter-wave film.

The wavelength range of the visible light is from about 400 nm to about 700 nm. The central wavelengths of the foregoing quarter-wave film are therefore selected within a range of between about 460 nm and 600 nm, for achieving a better performance. Furthermore, the invention provides broadband quarter-wave films to promote good compensation by the polarizer within the whole wavelength range of the visible light between about 400 nm and 700 nm.

Figure 2A:
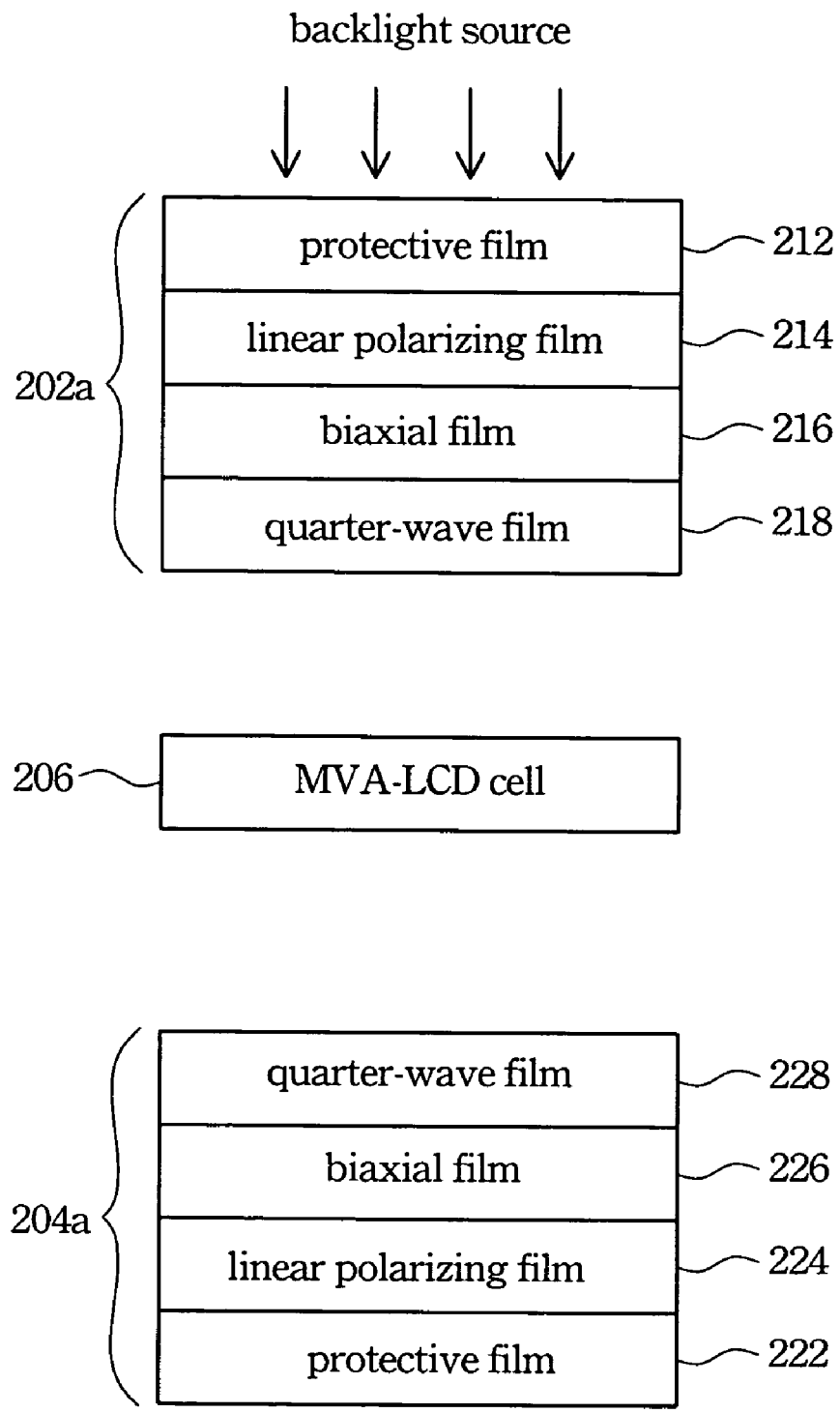
FIG. 2A illustrates a schematic view of one preferred embodiment of the invention.

FIG. 2A illustrates a schematic view of one preferred embodiment of the invention. In this preferred embodiment, the polarizer for an MVA-LCD includes two polarizer portions 202a and 204a. The polarizer portion 202a is adjacent to a backlight source and sequentially includes a protective film 212, a linear polarizing film 214, a biaxial film 216 and a quarter-wave film 218 from the backlight source to an MVA-LCD cell 206. The polarizer portion 204a is on the other side of the MVA-LCD cell 206, and sequentially includes a quarter-wave film 228, a biaxial film 226, a linear polarizing film 224 and a protective film 222 from the MVA-LCD cell 206.

The quarter-wave film 218 converts a linearly polarized light selected by the linear polarizing film 214 and preparing to enter the MVA-LCD cell 206 into a circularly polarized light. The circularly polarized light is not affected by the liquid crystal molecules at the domain boundaries which are aligned parallel to the absorption axis of the upper or lower linear polarizing film 214 or 224, thus eliminating the conventional dark, cross-like texture appearing in the center of the MVA-LCD cell 206. The other quarter-wave film 228, on the other side of the MVA-LCD 206 and placed symmetrically to the quarter-wave film 218, converts the circularly polarized light back into the linearly polarized light for entering the linear polarizing film 224.

In addition, the positions of the position biaxial film and quarter-wave film in each polarizer portion 202a and 204a are interchangeable, and are not limited by the arrangement illustrated in the preferred embodiment in FIG. 2A. However, it is noted that the interchanged arrangement thereof still must be symmetrical with regard to the MVA-LCD cell 206, which therefore can achieve the total compensation of the polarizer.

Figure 2B:
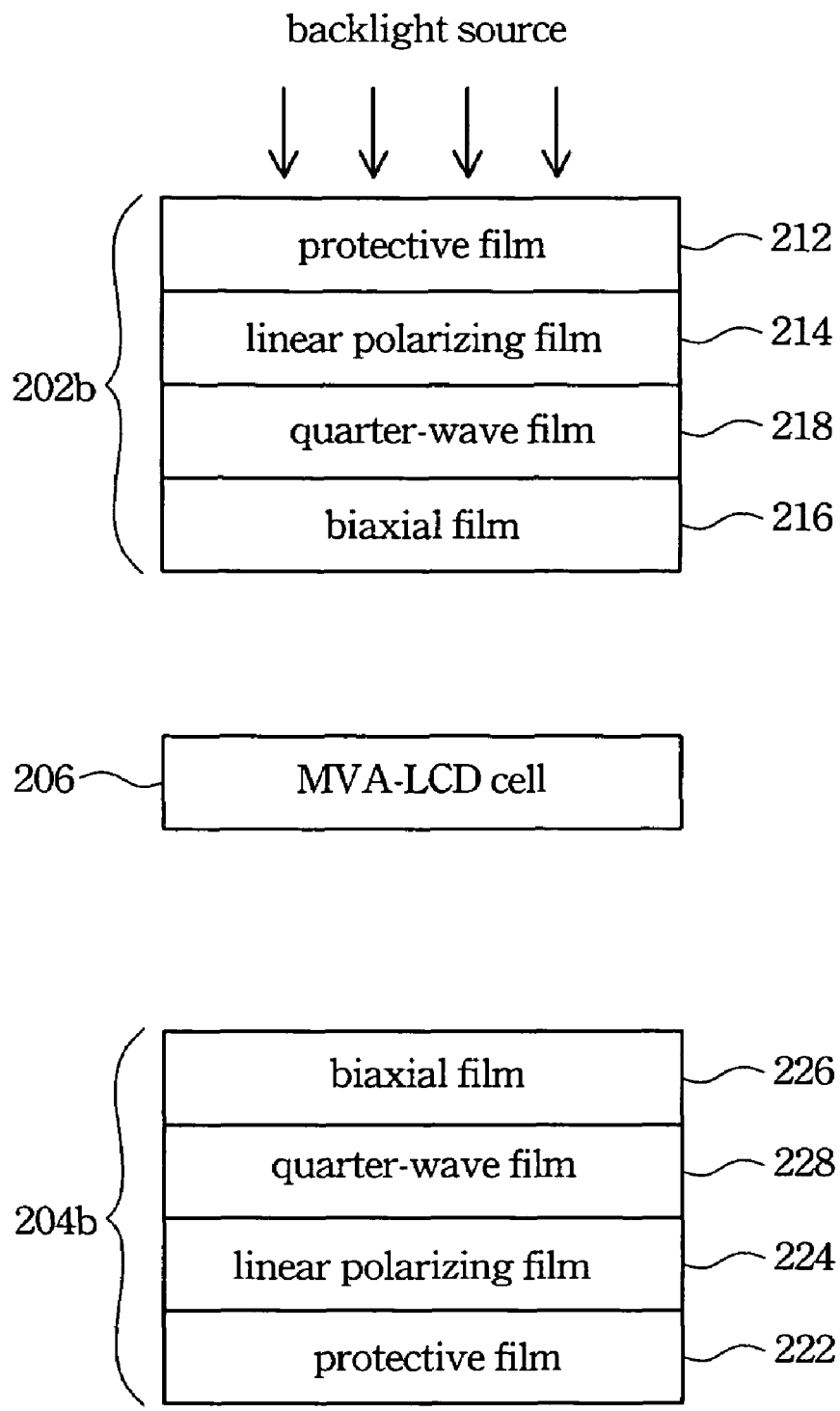
FIG. 2B illustrates a schematic view of another preferred embodiment of the invention.

FIG. 2B illustrates a schematic view of another preferred embodiment of the invention. Compared to the embodiment in FIG. 2A, the positions of the biaxial film 216 and the quarter-wave film 218 in the polarizer portion 202b are interchanged, and the positions of the biaxial film 226 and the quarter-wave film 228 in the polarizer portion 204b are also interchanged.

The light emitted from the backlight source is sequentially propagated through the protective film 212, the linear polarizing film 214, the quarter-wave film 218, the biaxial film 216, the MVA-LCD cell 206, the biaxial film 226, the quarter-wave film 228, the linear polarizing film 224 and the protective film 222. The polarizer in FIG. 2B thus can also obtain the same effect as the polarizer in FIG. 2A.

The optical characteristics of the two linear polarizing films in the invention are similar to those of the linear polarizing films in the prior art. In other words, the absorption axes of the two linear polarizing films are perpendicular to control the liquid crystal pixel representing ON or OFF state. Moreover, the slow axes of the two quarter-wave films are also perpendicular to ensure that after the former quarter-wave film converts the linearly polarized light into circular or elliptic polarized light, the subsequent quarter-wave film can totally convert the light back into the original linearly polarized light.

The following descriptions take the embodiment in FIG. 2A as an example to interpret the transformation procedure of the light polarizing directions. Firstly, the light emitted from the backlight source is propagated through the linear polarizing film 214 and thereby converting into a linearly polarized light having a single polarizing direction. The linearly polarized light is then propagated through the quarter-wave film 218. Based on the optical characteristics of the quarter-wave film 218, the quarter-wave film 218 converts the linearly polarized light into a circular or an elliptic polarized light.

The polarizing direction of the circular or elliptic polarized light rotates dependent on time to form a circle or an elliptic, and the multiple polarizing directions prevents occurrence the conventional dark, cross-like texture when the circular or elliptic polarized light is propagated through the MVA-LCD cell 206. After passing through the MVA-LCD cell 206, the circular or elliptic polarized light is then propagated through the other quarter-wave film 228. As discussed above, the slow axis of the quarter-wave film 228 is perpendicular to the slow axis of the quarter-wave film 218, such that the converted circular or elliptic polarized light is totally converted back into the original linearly polarized light, ready to enter the linear polarizing film 224.

For the absorption axes of the linear polarizing films 214/224 and the slow axes of the quarter-wave films 218/228, the invention further provides a preferred relationship therebetween as illustrated in following embodiments, which has optimized compensation. When an angle between the absorption axes of the linear polarizing films 214/224 and the slow axes of the quarter-wave films 218/228 is 45 degrees, the quarter-wave films 218/228 convert the linearly polarized light into the total circularly polarized light, not the elliptically polarized light. This means that the polarizing directions of the light are time-dependent to be distributed uniformly in every direction; in this condition, the polarizer of the invention therefore provides the optimal compensation.

Figure 3A:
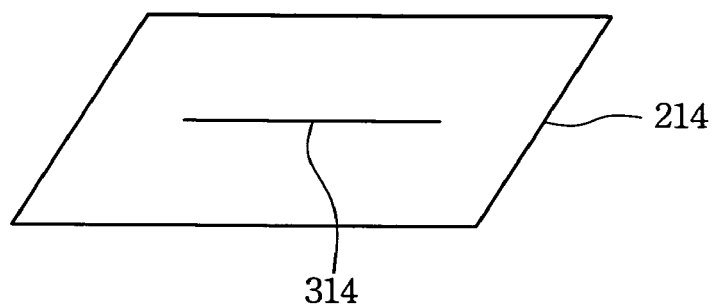
FIG. 3A illustrates a schematic view of another preferred embodiment of the invention.
Figure 3A:
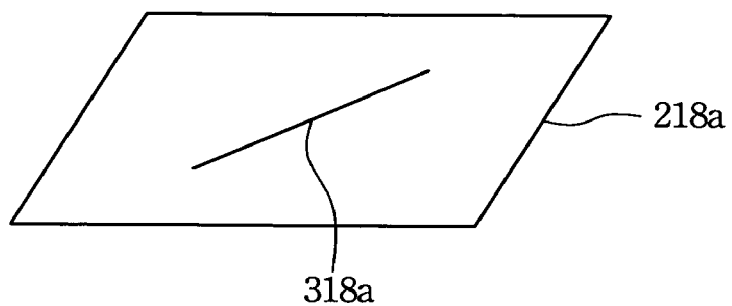
Figure 3A:
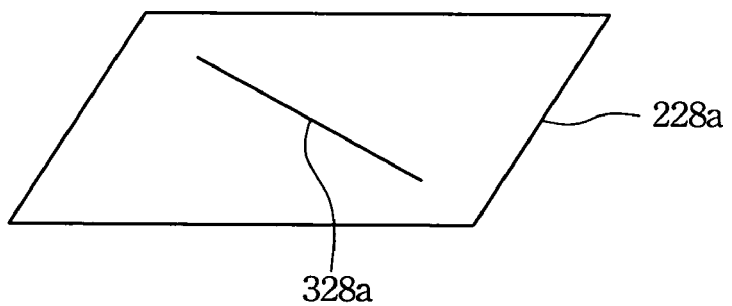
Figure 3A:
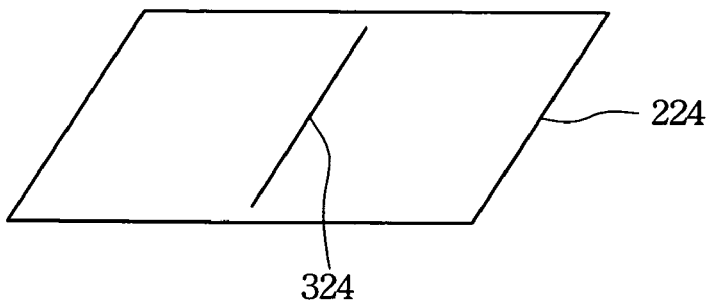
Figure 3B:
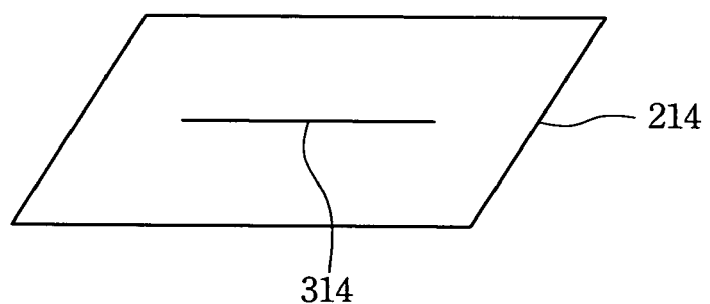
FIG. 3B illustrates a schematic view of another preferred embodiment of the invention.
Figure 3B:
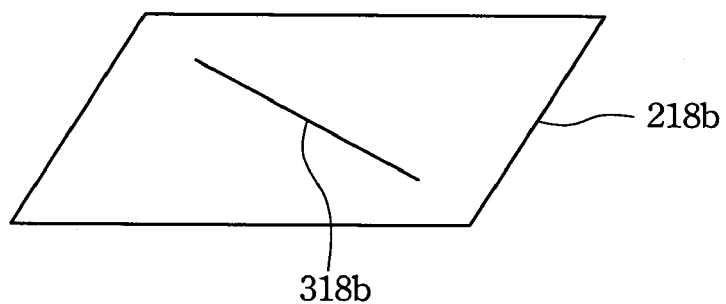
Figure 3B:
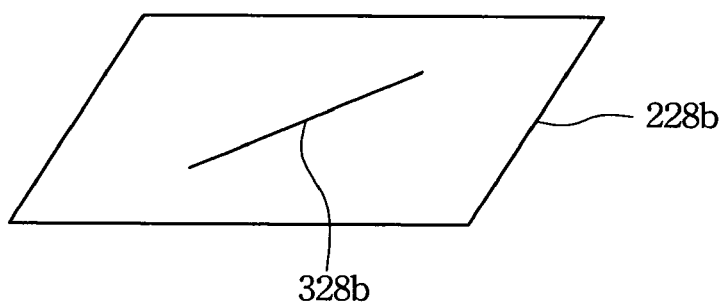
Figure 3B:
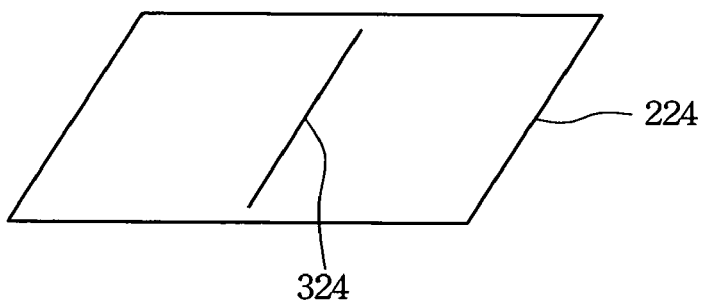

FIG. 3A and FIG. 3B illustrate schematic views of preferred embodiments of the invention, for illustrating two different conditions where the angle between the absorption axes of the linear polarizing films 214/224 and the slow axes of the quarter-wave films 218/228 is 45 degrees. In these two figures, FIG. 3A and FIG. 3B, the absorption axis 314 of the linearly polarized films 214 is horizontal, and the absorption axis 324 of the linearly polarized film 224 is vertical and perpendicular to the absorption axis 314.

In FIG. 3A, the slow axis 318a of the quarter-wave film 218a is perpendicular to the slow axis 328a of the quarter-wave film 228a, and the two slow axes 318a and 328a are both at angle of 45 degrees with the absorption axes 314 and 324 of the linear polarizing films 214 and 224, individually. Similarly, in FIG. 3B, the slow axis 318b of the quarter-wave film 218b is also perpendicular to the slow axis 328b of the quarter-wave film 228b, and the two slow axes 318a and 328a are also both at angle of 45 degrees with the absorption axes 314 and 324 of the linear polarizing films 214 and 224, individually.

Figure 4:
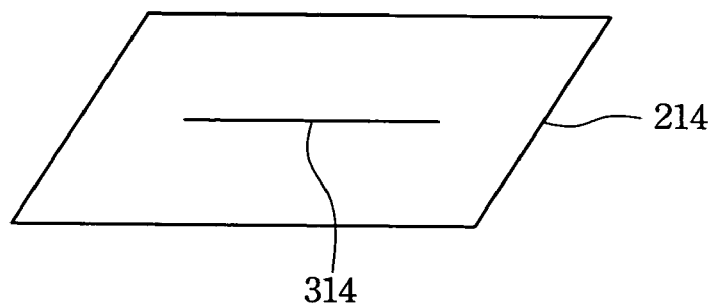
FIG. 4 illustrates a schematic view of another preferred embodiment of the invention.
Figure 4:
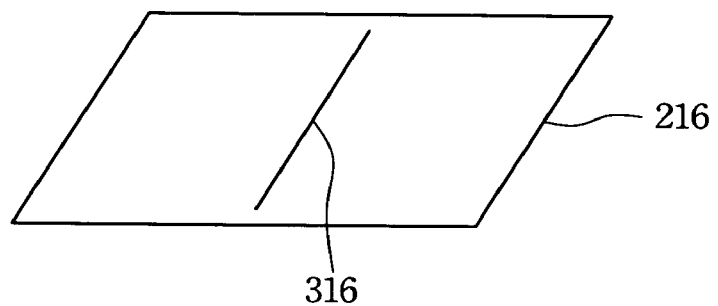
Figure 4:
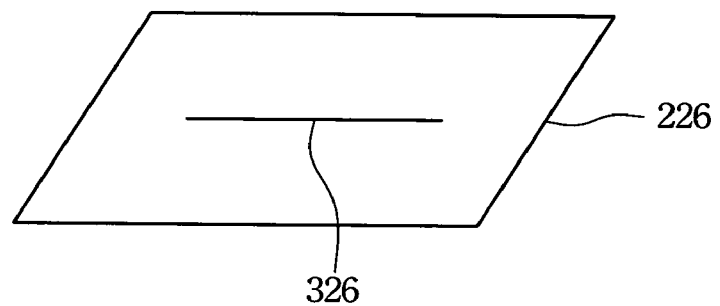
Figure 4:
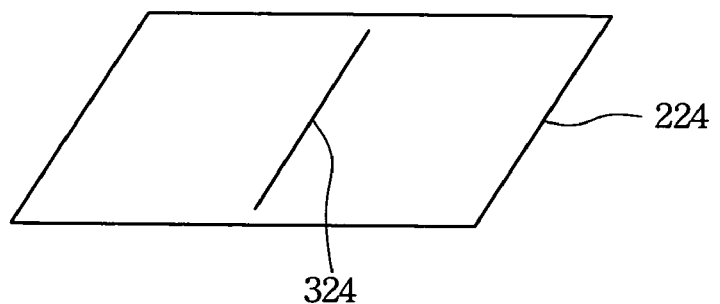

Furthermore, when the slow axes of the two biaxial films of the invention are perpendicular, and each of them is separately perpendicular to the absorption axes of the linear polarizing film adjacent thereto, the compensation effect in viewing-angle is optimized. FIG. 4 illustrates a schematic view of another preferred embodiment of the invention, to interpret the preferred relation between the slow axes of the biaxial films and the absorption axes of the linear polarizing films.

In FIG. 4, the slow axis 316 of the biaxial film 216 is perpendicular to the absorption axis 314 of the adjacent linear polarizing film 214, and the slow axis 326 of the biaxial film 226 is also perpendicular to the absorption axis 324 of the adjacent linear polarizing film 224. The slow axes 316 and 316 of the biaxial films 216 and 226 are certainly also perpendicular to each other, thus obtaining the optimized viewing-angle.

The wavelength range of the visible light, from blue to red, is from about 400 nm to 700 nm, and therefore the central wavelengths of the quarter-wave films 218 and 228 are selected to be in a range of between about 480 nm and 600 nm to achieve a better performance. In these embodiments of the invention, the central wavelengths of the quarter-wave films 218 and 228 are selected to be in a preferred range of between about 540 nm and 560 nm, the wavelengths of the green light. Nonetheless, in practice, the quarter-wave film is selected from different wavelengths; in other words, the conversion performance of the quarter-wave film is good near the central wavelength thereof, and the conversion performance of the other wavelengths depends on the bandwidth thereof. A normal narrowband quarter-wave film cannot have a good conversion performance in such a large range of visible light with wavelengths from about 400 nm to 700 nm.

Hence, the invention further provides a broadband quarter-wave film to allow the polarizer to obtain a good conversion performance in such a large range of visible light with wavelengths from about 400 nm to 700 nm. Alternatively, as other embodiments of the invention, a combination of a narrowband half-wave film and a narrowband quarter-wave film is provided to provide a good conversion performance equivalent to the broadband quarter-wave film.

Figure 5A:
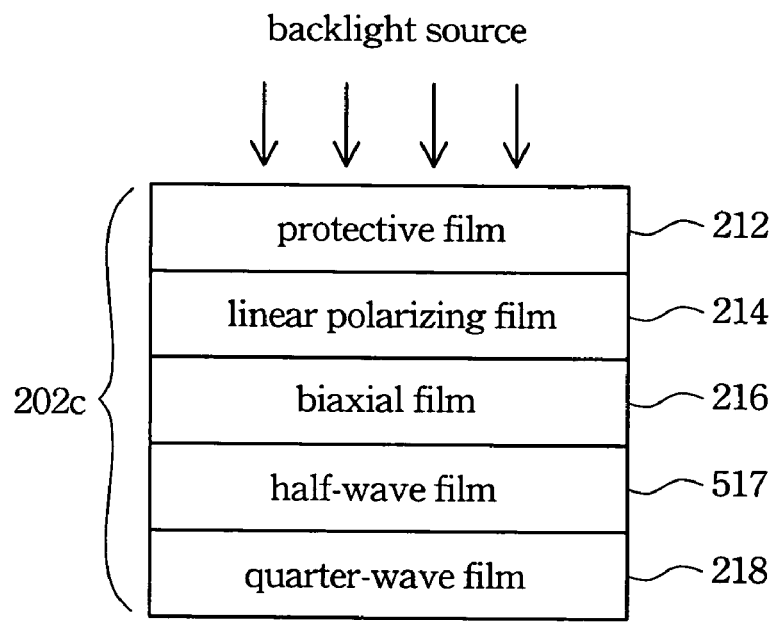
FIG. 5A illustrates a schematic view of another preferred embodiment of the invention.
Figure 5A:
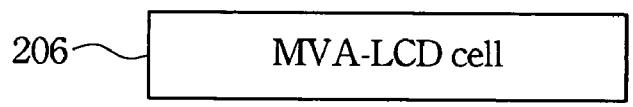
Figure 5A:
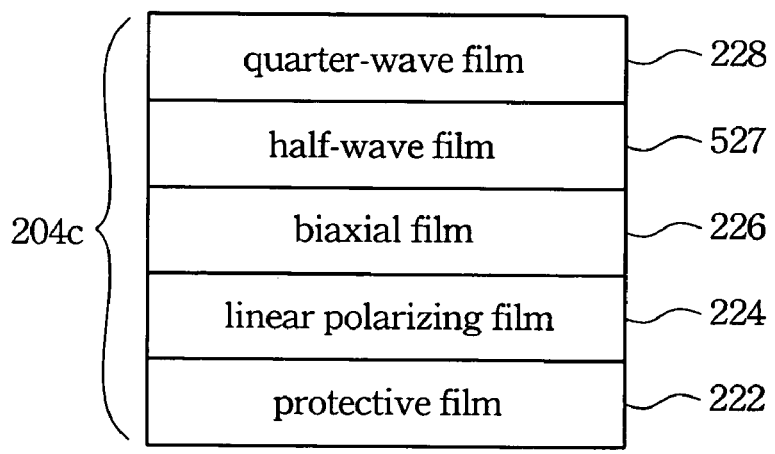
Figure 5B:
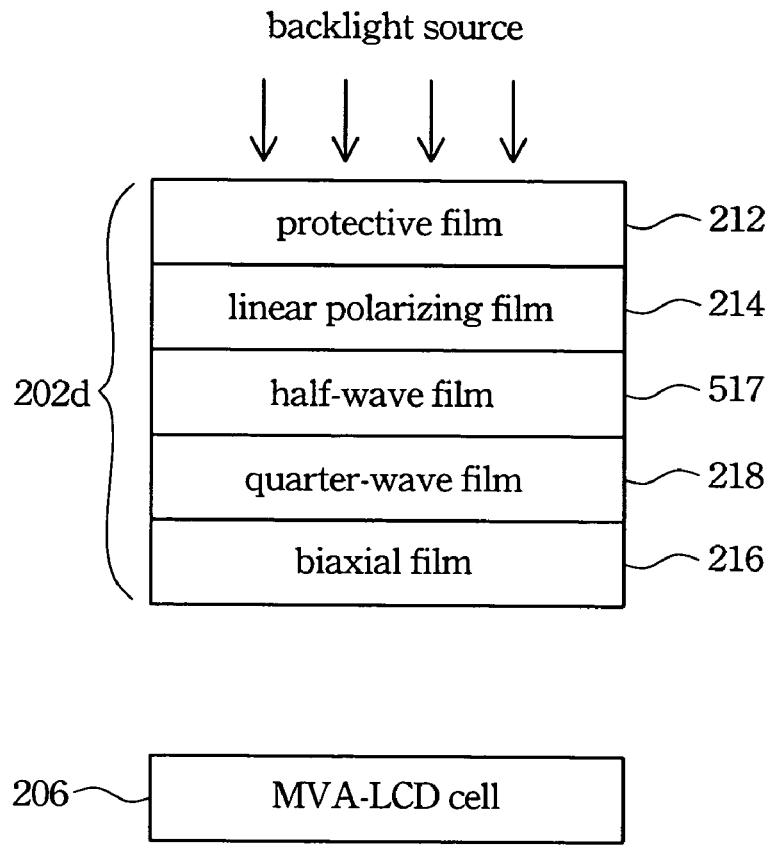
FIG. 5B illustrates a schematic view of another preferred embodiment of the invention.
Figure 5B:
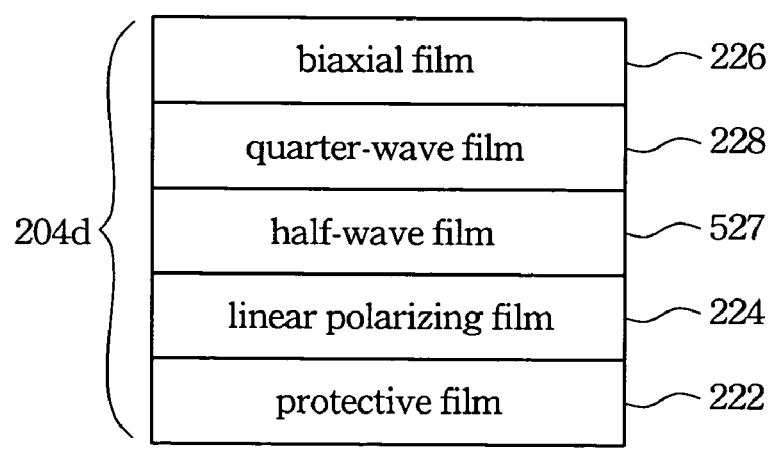

FIG. 5A and FIG. 5B illustrate schematic views of preferred embodiments of the invention, for practically interpreting the foregoing combination of the narrowband half-wave film and the narrowband quarter-wave film provided for achieving a good conversion performance equivalent to the broadband quarter-wave film.

The embodiment illustrated in FIG. 5A adds two half-wave films to the embodiment illustrated in FIG. 2A. The half-wave film 517 is placed in the polarizer portion 202c and between the quarter-wave film 218 and the biaxial film 216, and the other half-wave film 527 is placed in the polarizer portion 204c and between the quarter-wave film 228 and the biaxial film 226. Similarly, the embodiment illustrated in FIG. 5B adds two half-wave films to the embodiment illustrated in FIG. 2B. The half-wave film 517 is placed in the polarizer portion 202d and between the quarter-wave film 218 and the biaxial film 216, and the other half-wave film 527 is placed in the polarizer portion 204d and between the quarter-wave film 228 and the biaxial film 226.

It is noted that, in these two embodiments in FIG. 5A and FIG. 5B, for the broadband quarter-wave films separately and respectively formed by the half-wave films 517/527 and the quarter-wave films 218/228, the equivalent slow axes thereof are like the preferred embodiments in FIG. 3A and FIG. 3B, at an angle of 45 degrees with the absorption axes of the linear polarizing films 214 and 224. The broadband quarter-wave films thus convert the linearly polarized light of large wavelength range into circularly polarized light whose polarizing direction is varied in every direction with time, thus providing the optimal conversion performance.

According to one preferred embodiment of the invention, an angle between the absorption axis of the linear polarizing films 214/224 and a slow axis of the quarter-wave films 218/228 adjacent thereto is between about 50 and 80 degrees, and an angle between the absorption axes of the linear polarizing films 214/224 and the slow axes of the half-wave films 517/527 adjacent thereto is between about 0 and 40 degrees.

The following descriptions interpret materials of the quarter-wave films 218 and 228 or the half-wave films 517 and 527, the linear polarizing films 214 and 224, and the protective films 212 and 222 in some preferred embodiments of the invention.

In the foregoing preferred embodiments, the quarter-wave films 218 and 228 and the half-wave films 517 and 527 are single-axial extending retarder films, and a material thereof is polynorbornene or polycarbonate (PC). Because the extending characteristics of polyvinyl alcohol (PVA) include polarizing light, it is therefore usually used as a material of the linear polarizing films 214 and 224 of the invention.

Moreover, after extending, the mechanical properties of the PVA decay and it easily break into pieces, therefore the protective films 212 and 222 are usually used to protect the PVA from breaking. A material of the protective films 212 and 222 can be triacetyl cellulose (TAC), polycarbonate, or polynorborene, which not only protects the PVA but also prevent the linear polarizing film 214 and 224 from shrinking.

The invention uses a quarter-wave film to convert the linearly polarized light entering the MVA cell into the circularly polarized light, thus preventing linearly polarized light with a polarizing direction in a single direction from being affected by the liquid crystal molecules tilted parallel to the absorption axis of the first or second linear polarizing film to generate the dark, cross-like texture in the pixel center. Therefore, the invention raises the light efficiency and increases the ON state brightness of the liquid crystal display, and extends the lifetime of the lamp tubes of the backlight source.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A polarizer for a multi-domain vertical alignment liquid crystal display, comprising:
   a first protective film;
   a first linear polarizing film;
   a first biaxial film;
   a first quarter-wave film;
   a second quarter-wave film;
   a second biaxial film;
   a second linear polarizing film; and
   a second protective film;
   wherein the first protective film, the first linear polarizing film, the first biaxial film, the first quarter-wave film, the second quarter-wave film, the second biaxial film, the second linear polarizing film and the second protective film are placed in order from a backlight source, an absorption axis of the first linear polarizing film is substantially perpendicular to an absorption axis of the second linear polarizing film, a slow axis of the first quarter-wave film is substantially perpendicular to a slow axis of the second quarter-wave film, the first quarter-wave film comprises a first narrowband quarter-wave film and a first narrowband half-wave film, and the second quarter-wave film comprises a second narrowband quarter-wave film and a second narrowband half-wave film the first narrowband half-wave film is placed between the first biaxial film and the first narrowband quarter-wave film, and the second narrowband half-wave film is placed between the second biaxial film and the second narrowband quarter-wave film.

2. The polarizer of claim 1, wherein an angle between the absorption axis of the first linear polarizing film and the slow axis of the first quarter-wave film is about 45 degrees.

3. The polarizer of claim 1, wherein a range of central wavelengths of the first quarter-wave film and the second quarter-wave film is between about 480 nm and 600 nm.

4. The polarizer of claim 1, wherein the first quarter-wave film and the second quarter-wave film are broadband quarter-wave films.

5. The polarizer of claim 4, wherein transmission bands of the broadband quarter-wave films include a wavelength range between about 400 nm and 700 nm.

6. The polarizer of claim 1, wherein an angle between the absorption axis of the first linear polarizing film and a slow axis of the first narrowband quarter-wave film is between about 50 and 80 degrees, and an angle between the absorption axis of the first linear polarizing film and a slow axis of the first narrowband half-wave film is between about 0 and 40 degrees.

7. A polarizer for a multi-domain vertical alignment liquid crystal display, comprising:
   a first protective film;
   a first linear polarizing film;
   a first biaxial film;
   a first quarter-wave film;
   a second quarter-wave film;
   a second biaxial film;
   a second linear polarizing film; and
   a second protective film;
   wherein the first protective film, the first linear polarizing film, the first biaxial film, the first quarter-wave film, the second quarter-wave film, the second biaxial film, the second linear polarizing film and the second protective film are placed in order from a backlight source, an absorption axis of the first linear polarizing film is substantially perpendicular to an absorption axis of the second linear polarizing film, a slow axis of the first quarter-wave film is substantially perpendicular to a slow axis of the second quarter-wave film, the first quarter-wave film comprises a first narrowband quarter-wave film and a first narrowband half-wave film, and the second quarter-wave film comprises a second narrowband quarter-wave film and a second narrowband half-wave film, the first narrowband half-wave film is placed between the first linear polarizing film and the first narrowband quarter-wave film, and the second narrowband half-wave film is placed between the second linear polarizing film and the second narrowband and quarter-wave film.

8. The polarizer of claim 7, wherein an angle between the absorption axis of the first linear polarizing film and a slow axis of the first narrowband quarter-wave film is between about 50 and 80 degrees, and an angle between the absorption axis of the first linear polarizing film and a slow axis of the first narrowband half-wave film is between about 0 and 40 degrees.

9. The polarizer of claim 1, wherein a slow axis of the first biaxial film is substantially perpendicular to a slow axis of the second biaxial film, and an angle between the absorption axis of the first linear polarizing film and the slow axis of the first biaxial film is about 90 degrees.

10. The polarizer of claim 1, wherein materials of the first protective film and the second protective film are selected from a group consisting of triacetyl cellulose (TAC), polycarbonate and polynorborene.

11. The polarizer of claim 1, wherein a material of the first linear polarizing film and the second linear polarizing film is polyvinyl alcohol (PVA).

12. The polarizer of claim 1, wherein materials of the first quarter-wave film and the second quarter-wave film are selected from a group consisting of polynorbornene and polycarbonate.

13. A polarizer for a multi-domain vertical alignment liquid crystal display, comprising:
   a first protective film;
   a first linear polarizing film;
   a first quarter-wave film;
   a first biaxial film;
   a second biaxial film;
   a second quarter-wave film;
   a second linear polarizing film; and
   a second protective film;
   wherein the first protective film, the first linear polarizing film, the first quarter-wave film, the first biaxial film, the second biaxial film, the second quarter-wave film, the second linear polarizing film and the second protective film are placed in order from a backlight source, an absorption axis of the first linear polarizing film is substantially perpendicular to an absorption axis of the second linear polarizing film, slow axis of the first quarter-wave film is substantially perpendicular to a slow axis of the second quarter-wave film, the first quarter-wave film comprises a first narrowband quarter-wave film and a first narrowband half-wave film, and the second quarter-wave film comprises a second narrowband quarter-wave film and a second narrowband half-wave film, the first narrowband half-wave film is placed between the first biaxial film and the first narrowband quarter-wave film, and the second narrowband half-wave film is placed between the second biaxial film and the second narrowband quarter-wave film.

14. The polarizer of claim 13, wherein an angle between the absorption axis of the first linear polarizing film and the slow axis of the first quarter-wave film is about 45 degrees.

15. The polarizer of claim 13, wherein a range of central wavelengths of the first quarter-wave film and the second quarter-wave film is between about 480 nm and 600 nm.

16. The polarizer of claim 13, wherein the first quarter-wave film and the second quarter-wave film are broadband quarter-wave films.

17. The polarizer of claim 16, wherein transmission bands of the broadband quarter-wave films include a wavelength range between about 400 nm and 700 nm.

18. The polarizer of claim 13, wherein an angle between the absorption axis of the first linear polarizing film and a slow axis of the first narrowband quarter-wave film is between about 50 and 80 degrees, and an angle between the absorption axis of the first linear polarizing film and a slow axis of the first narrowband half-wave film is between about 0 and 40 degrees.

19. A polarizer for a multi-domain vertical alignment liquid crystal display, comprising:
   a first protective film;
   a first linear polarizing film;
   a first quarter-wave film;
   a first biaxial film;
   a second biaxial film;
   a second quarter-wave film;
   a second liner polarizing film; and
   a second protective film;
   wherein the first protective film, the first linear polarizing film, the first quarter-wave film, the first biaxial film the second biaxial film, the second quarter-wave film, the second linear polarizing film and the second protective film are placed in order from a backlight source, an absorption axis of the first linear polarizing film is substantially perpendicular to an absorption axis of the second linear polarizing film, a slow axis of the first quarter-wave film is substantially perpendicular to a slow axis of the second quarter-wave film, the first quarter-wave film comprises a first narrowband quarter-wave film and a first narrowband half-wave film, and the second quarter-wave film comprises a second narrowband quarter-wave film and a second narrowband half-wave film, the first narrowband half-wave film is placed between the first linear polarizing film and the first narrowband quarter-wave film, and the second narrowband half-wave film is placed between the second linear polarizing film and the second narrowband quarter-wave film.

20. The polarizer of claim 19, wherein an angle between the absorption axis of the first linear polarizing film and a slow axis of the first narrowband quarter-wave film is between about 50 and 80 degrees, and an angle between the absorption axis of the first linear polarizing film and a slow axis of the first narrowband half-wave film is between about 0 and 40 degrees.

21. The polarizer of claim 13, wherein a slow axis of the first biaxial film is substantially perpendicular to a slow axis of the second biaxial film, and an angle between the absorption axis of the first linear polarizing film and the slow axis of the first biaxial film is about 90 degrees.

22. The polarizer of claim 13, wherein materials of the first protective film and the second protective film are selected from a group consisting of triacetyl cellulose (TAC), polycarbonate and polynorborene.

23. The polarizer of claim 13, wherein a material of the first linear polarizing film and the second linear polarizing film is polyvinyl alcohol (PVA).

24. The polarizer of claim 13, wherein materials of the first quarter-wave film and the second quarter-wave film are selected from a group consisting of polynorbornene and polycarbonate.

* * * * *